(12) United States Patent
Kitzman et al.

(10) Patent No.: US 9,891,111 B2
(45) Date of Patent: Feb. 13, 2018

(54) THERMOWELL WITH INFRARED SENSOR

(71) Applicant: Rosemount Inc., Shakopee, MN (US)

(72) Inventors: Andrew John Kitzman, Chandler, AZ (US); Sascha Ulrich Kienitz, Munich (DE); Jason Harold Rud, Mayer, MN (US)

(73) Assignee: Rosemount Inc., Shakopee, MN (US)

(*) Notice: Subject to any disclaimer, the term of this patent is extended or adjusted under 35 U.S.C. 154(b) by 0 days.

(21) Appl. No.: 14/755,126

(22) Filed: Jun. 30, 2015

(65) Prior Publication Data

US 2017/0003173 A1    Jan. 5, 2017

(51) Int. Cl.
| | |
|---|---|
| *G01J 5/04* | (2006.01) |
| *G01J 5/00* | (2006.01) |
| *G01J 5/06* | (2006.01) |
| *G01J 5/08* | (2006.01) |
| *G01J 5/10* | (2006.01) |

(52) U.S. Cl.
CPC ............ *G01J 5/048* (2013.01); *G01J 5/0037* (2013.01); *G01J 5/061* (2013.01); *G01J 5/0803* (2013.01); *G01J 5/10* (2013.01); *G01J 2005/065* (2013.01)

(58) Field of Classification Search
CPC .. G01J 5/048; G01J 5/0803; G01J 5/10; G01J 5/12
USPC ............ 250/353, 338.3, 338.1, 338.5, 336.1
See application file for complete search history.

(56) References Cited

U.S. PATENT DOCUMENTS

| | | | |
|---|---|---|---|
| 4,137,768 A | 2/1979 | Tushie et al. | |
| 4,324,945 A * | 4/1982 | Sivyer | G01K 1/08 136/230 |
| 4,510,343 A * | 4/1985 | Sivyer | G01K 13/02 136/230 |
| 4,737,038 A * | 4/1988 | Dostoomian | G01J 5/0037 250/577 |
| 4,743,752 A | 5/1988 | Olsen et al. | |
| 4,778,538 A * | 10/1988 | Lyman | G01K 13/02 136/221 |

(Continued)

FOREIGN PATENT DOCUMENTS

| | | | |
|---|---|---|---|
| DE | 103 45 299 | 7/2005 | |
| DE | 10345299 B3 * | 7/2005 | G01J 5/041 |

(Continued)

OTHER PUBLICATIONS

First Chinese Office Action for Chinese Patent Application No. 201520363314.8, dated Sep. 29, 2015, 4 pages.

(Continued)

*Primary Examiner* — David Porta
*Assistant Examiner* — Blake Riddick
(74) *Attorney, Agent, or Firm* — Westman, Champlin & Koehler, P.A.

(57) ABSTRACT

A thermowell assembly for measuring a process temperature includes an elongate thermowell having a proximal end and a distal end. A bore extends between the two ends with the thermowell assembly configured to extend into a process fluid. An infrared sensor detects infrared radiation from the distal end through the bore of the thermowell and responsively provides a sensor output. A configuration is provided in which infrared radiation received by the infrared sensor from a wall of the bore is reduced and or radiation received from the distal end of the bore is increased.

17 Claims, 8 Drawing Sheets

(56) References Cited

U.S. PATENT DOCUMENTS

| | | | |
|---|---|---|---|
| 4,831,252 A | 5/1989 | Ihnat et al. | |
| 4,850,717 A * | 7/1989 | Clark | G01K 1/08 374/208 |
| 4,859,076 A * | 8/1989 | Twerdochlib | G01K 3/14 136/230 |
| 4,925,638 A * | 5/1990 | Chakravarti | G01K 1/14 136/230 |
| 4,958,938 A * | 9/1990 | Schwartz | G01K 1/10 136/230 |
| 5,147,137 A * | 9/1992 | Thiesen | G01K 1/125 136/234 |
| 5,302,027 A | 4/1994 | Park | |
| 5,348,395 A | 9/1994 | Corr, II et al. | |
| 5,399,018 A | 3/1995 | Hollander et al. | |
| 5,590,240 A * | 12/1996 | Rezabek | F24H 1/162 165/184 |
| 5,632,556 A * | 5/1997 | Sivyer | G01K 13/02 136/230 |
| 5,858,311 A * | 1/1999 | Bachtel | C10G 49/26 122/511 |
| 6,053,632 A * | 4/2000 | Leininger | G01J 5/041 374/130 |
| 6,059,453 A | 5/2000 | Kempf et al. | |
| 6,231,230 B1 * | 5/2001 | Baldock | G01K 1/146 374/179 |
| 6,390,673 B1 * | 5/2002 | Camburn | G01K 13/02 374/138 |
| 6,536,950 B1 * | 3/2003 | Green | G01K 1/10 374/141 |
| 6,612,156 B1 * | 9/2003 | Hakimuddin | B01F 3/1242 73/597 |
| 7,290,450 B2 * | 11/2007 | Brown | G01F 1/666 73/579 |
| 7,465,086 B1 * | 12/2008 | Foreman, Jr. | G01K 1/08 136/200 |
| 7,579,947 B2 | 8/2009 | Peluso | |
| 7,644,633 B2 * | 1/2010 | Schmidt | G01F 1/3209 73/861.22 |
| 2002/0085617 A1 * | 7/2002 | Gul | G01K 1/14 374/208 |
| 2003/0028345 A1 | 2/2003 | Watkins et al. | |
| 2004/0009075 A1 * | 1/2004 | Meza | F04B 43/0054 417/32 |
| 2005/0208908 A1 * | 9/2005 | Karschnia | G08C 17/00 455/127.1 |
| 2006/0017821 A1 | 1/2006 | Garvey, III et al. | |
| 2006/0204367 A1 * | 9/2006 | Meza | F04B 43/0054 417/53 |
| 2006/0278827 A1 | 12/2006 | Sierra et al. | |
| 2007/0085670 A1 * | 4/2007 | Peluso | G01D 3/08 340/501 |
| 2009/0199634 A1 * | 8/2009 | Tonner | G01F 23/242 73/295 |
| 2009/0211368 A1 * | 8/2009 | Garnett | G01F 1/46 73/861.22 |
| 2010/0135862 A1 * | 6/2010 | Yoon | B01J 3/03 422/117 |
| 2010/0316086 A1 * | 12/2010 | Engelstad | G01K 1/14 374/1 |
| 2011/0054822 A1 | 3/2011 | Bauschke et al. | |
| 2011/0150033 A1 * | 6/2011 | Egan | G01K 1/08 374/141 |
| 2011/0150034 A1 * | 6/2011 | Breimon | G01K 1/08 374/148 |
| 2011/0301867 A1 * | 12/2011 | Davis | G01F 1/88 702/30 |
| 2012/0300808 A1 * | 11/2012 | Martensson | G01K 1/08 374/165 |
| 2013/0107908 A1 * | 5/2013 | Lukach, Jr. | G01K 1/16 374/208 |
| 2013/0191556 A1 * | 7/2013 | Holmstadt | G01D 5/06 710/16 |
| 2013/0283928 A1 * | 10/2013 | Wiklund | G01K 1/08 73/861.18 |
| 2014/0036960 A1 * | 2/2014 | Middleton | B23K 20/129 374/208 |
| 2014/0269820 A1 | 9/2014 | Perrault et al. | |
| 2015/0330840 A1 * | 11/2015 | Lukach, Jr. | G01K 1/16 374/208 |
| 2016/0178441 A1 * | 6/2016 | Rud | G01H 17/00 374/117 |

FOREIGN PATENT DOCUMENTS

| | | |
|---|---|---|
| EP | 0 438 880 A2 | 7/1991 |
| EP | 1 835 270 | 9/2007 |
| JP | 2000-46653 | 2/2000 |
| WO | WO 2014/158423 | 10/2014 |

OTHER PUBLICATIONS

Notification of Transmittal of the International Search Report and the Written Opinion of the International Searching Authority from PCT/US2015/065744, dated Mar. 18, 2016.

Notification of Transmittal of the International Search Report and the Written Opinion of the International Searching Authority from PCT/US2016/036140, dated Oct. 5, 2016.

Office Action from U.S. Appl. No. 14/578,849, dated May 18, 2017.

Communication from European Patent Application No. 15823256.1, dated Jul. 28, 2017.

* cited by examiner

THERMOWELL WITH INFRARED SENSOR

BACKGROUND

The present invention relates to thermowells of the type used in temperature sensors. More specifically, the present invention relates to using an infrared sensor to measure temperature in such thermowells.

Industrial process sensors and transmitters are used to sense various characteristics of fluid flowing through a conduit, or contained within a vessel. The transmitters sense process parameters such as differential pressure, line pressure, temperature, and pH.

One type of temperature sensor uses thermocouples or resistance based temperature detectors which are typically protected by a metal or ceramic sheath known as a thermowell. The sensor is connected to an electronic circuit in a transmitter that reads the sensor signal and convert it to a temperature reading. The transmitter transmits the reading to a remote recipient such as a control, monitoring and/or safety system. The temperature value can be transmitted through different types of signals and media. It can be converted into an analog standard value such as 4 to 20 mA or through digital protocols such as HART®, Fieldbus, Profibus, DeviceNet, Modbus, Ethernet, etc. The transmitting media can be via wires, fiber optic, infrared or RF.

Infrared (IR) sensors are also known for sensing temperature.

SUMMARY

A thermowell assembly for measuring a process temperature includes an elongate thermowell having a proximal end and a distal end. A bore extends between the two ends with the thermowell assembly configured to extend into a process fluid. An infrared sensor detects infrared radiation from the distal end through the bore of the thermowell and responsively provides a sensor output. A configuration is provided in which infrared radiation received by the infrared sensor from a wall of the bore is reduced and or radiation received from the distal end of the bore is increased.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION OF ILLUSTRATIVE EMBODIMENTS

Figure 1:
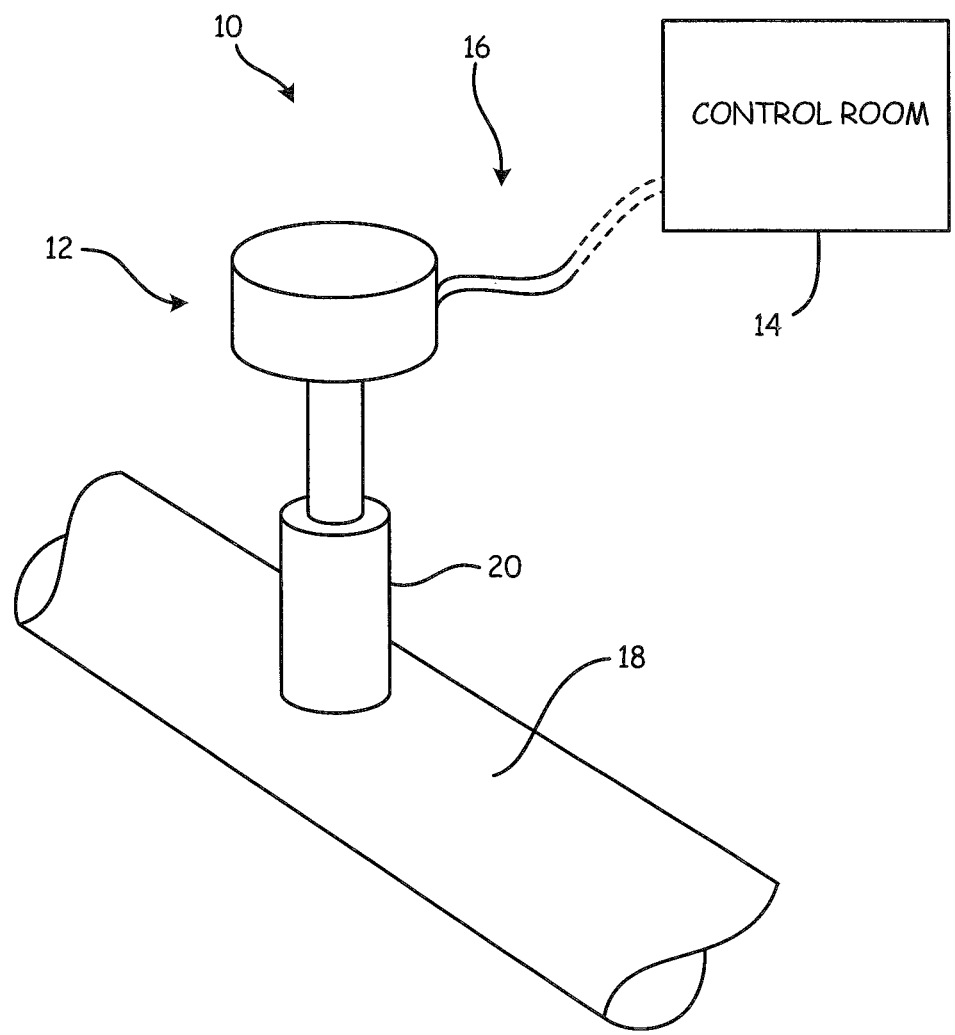
FIG. 1 is a perspective view showing a temperature transmitter including a thermowell assembly coupled to a process vessel and communicating with a process control room.

FIG. 1 is a simplified diagram illustrating process control system, 10, which includes transmitter (or sensor) 12 and control room equipment 14 connected over a transmission loop 16 that can be a two or more wire cable, or a fiber optic cable, or a wireless link. In this embodiment, transmitter 12 measures temperature. Transmitter 12 includes a thermowell assembly 20 which is mounted on process piping 18, and provides an output over loop 16 representing measured temperature of process fluid in piping 18. Transmitter 12 may be a temperature transmitter, may be a sensing device that includes transmitter electronics located within a sensor housing, or may be a sensing device that communicates with control room equipment 14 directly or through a separate transmitter.

Transmitter 12 transmits temperature information to control room equipment 14 in analog and/or digital form. For example, sensor/transmitter 12 may transmit an analog signal representative of measured temperature by controlling the loop current flowing in loop 16 between 4 and 20 milliamps. In addition, transmitter 12 may transmit to control room 14 digital information related to measured temperature, to a measured secondary process parameter, or to diagnostic data. Transmission of digital information over loop 16 can, for example, be transmitted using the Highway Addressable Remote Transducer (HART®) protocol. Alternatively, temperature information, as well as secondary measurements and diagnostic information can be transmitted by transmitter 12 to control room 14 using an all digital protocol such as Foundation Fieldbus, Profibus, Modbus, etc. Further, the loop may employ various wireless communication techniques such as the Wireless HART® communication protocol in accordance with the IEC 62591. Standard Ethernet, fiberoptic connection, or other communication channels may also be used. In one configuration, loop 16 is also used to provide some or all power to transmitter 12. Transmitter 12 provides a thermowell system for measuring a process temperature.

Figure 2:
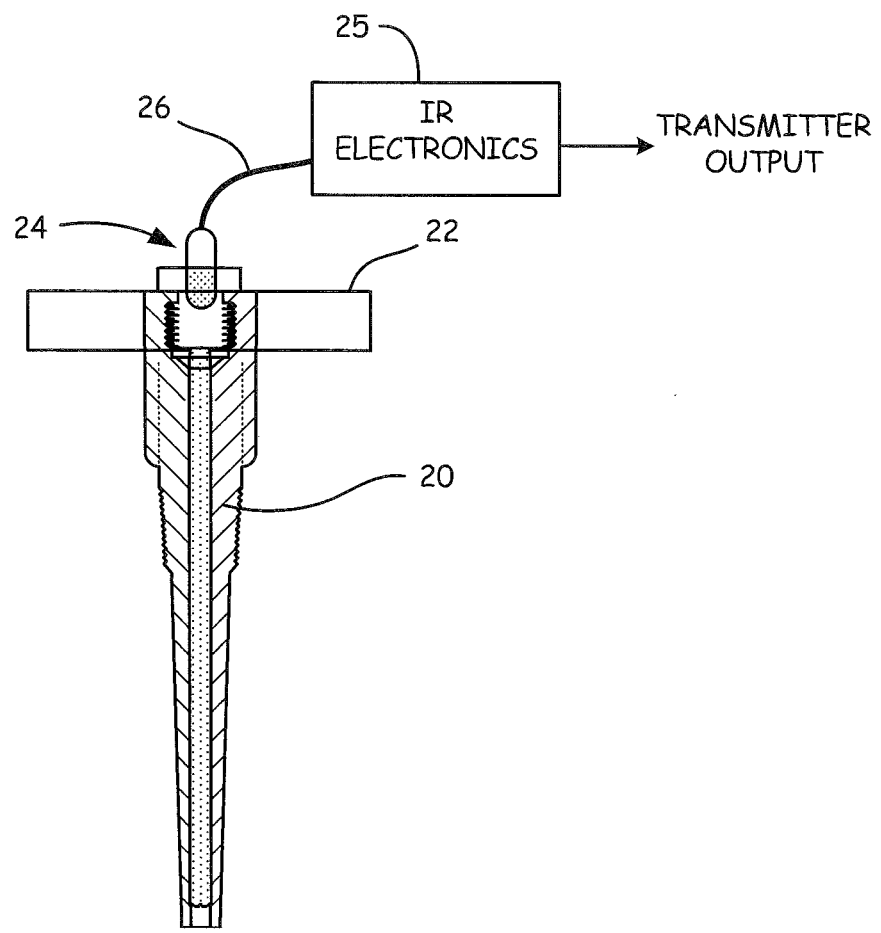
FIG. 2 is a front plan view of the thermowell assembly of FIG. 1.

FIG. 2 is a front perspective view of thermowell 20 coupled to transmitter 12 shown in FIG. 1. Thermowell 20 is mounted on flange 22 and extends into process piping 18 and comprises a hollow tube with its distal end sealed. The thermowell 20 may be formed of any appropriate material including metals, plastics, ceramics, composites, and combinations thereof.

As illustrated in FIG. 2, an infrared (IR) spot sensor 24 is mounted at a proximal end of thermowell 20 and is directed to receive radiation from a distal end of the thermowell 20. Wiring 26 is used to couple IR sensor 24 to IR electronics 25.

In accordance with Planck's Law, an interior wall of the bore through the thermowell 20 will emit radiation which is related to the temperature of the wall. The infrared sensor 24 is arranged to sense the radiation emitted in accordance with Planck's Law and responsively provide a sensor output. The sensor output can be correlated with the temperature of the thermowell 20 and provide an indirect measurement of the temperature of process fluid carried in process piping 18. The infrared sensor 24 may include optics configured to focus the sensor along the bore of the thermowell 20.

Figure 3:
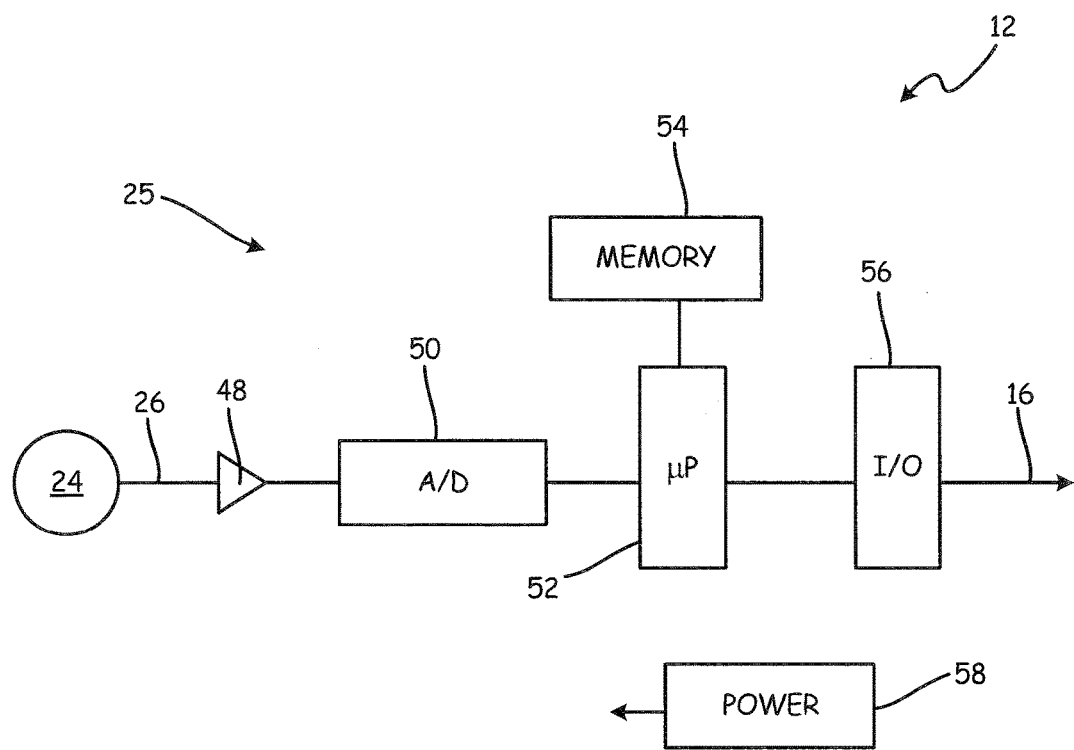
FIG. 3 is a simplified schematic diagram showing a temperature sensor which shows an infrared sensor which receives infrared radiation from the thermowell of FIG. 2 and associated circuitry for providing an output to process temperature.
Figure 4:
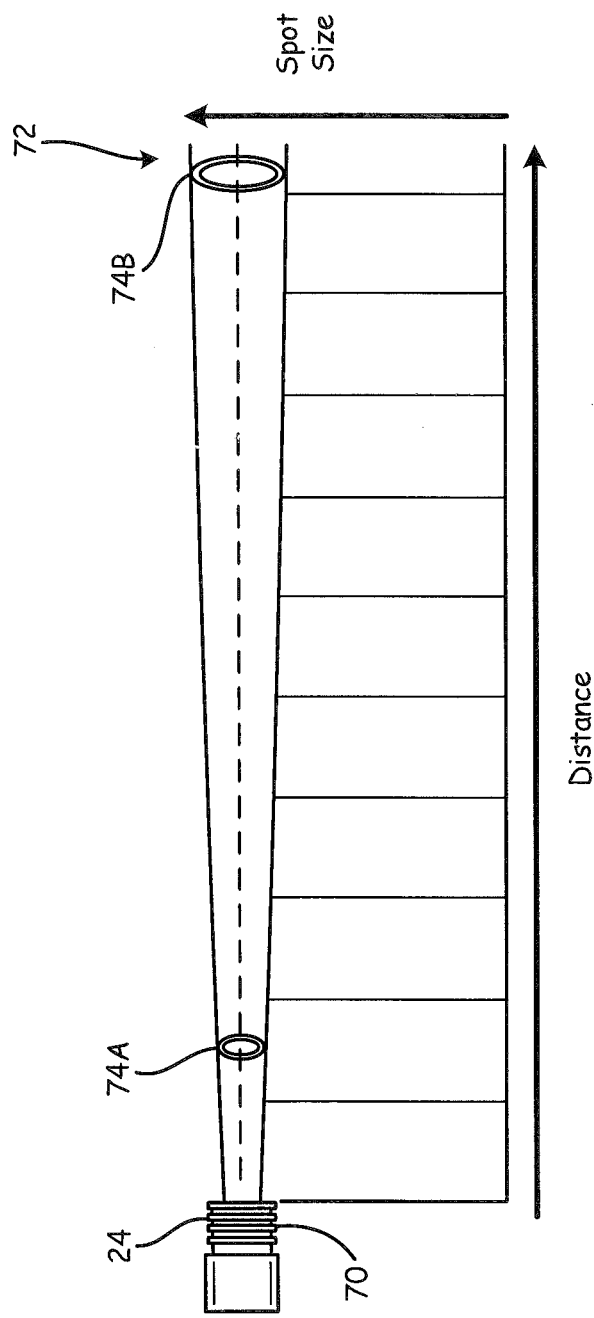
FIG. 4 is a diagram illustrating spot size with respect to distance for an infrared sensor.

FIG. 3 is a simplified block diagram showing IR electronics 25 of transmitter 12 in accordance with one example configuration. As illustrated in FIG. 4, the output of the infrared sensor 24 is provided to an amplifier 48 and digitized by analog to digital converter 50. A microprocessor 52 or other controller receives the digitized signal and operates in accordance with instructions stored in memory 54. Communication capabilities are provided by I/O circuitry 56 which is used for communicating over the process control loop 16. A power source 58 is provided for powering the circuitry of the transmitter 12. The power source may be an internal source such as a battery, and may be provided by an external source including power received over the process control loop 16.

During operation, the microprocessor 52 receives a digitized signal representative of the output from sensor 24. Microprocessor 52 can correlate this digitized signal with the temperature of the process fluid in accordance with Planck's Law. Temperature related information is transmitted on the process control loop 16 using I/O circuitry 56.

As discussed above, the infrared sensor 24 is arranged to receive infrared radiation from the distal end of thermowell 20. FIG. 4 is an illustration of the emission pattern of infrared radiation within the thermowell 20. As illustrated in FIG. 4, infrared sensor 24 is positioned at a proximal end 70 of the thermowell 20. Infrared radiation from a distal end 72 of the thermowell is received at the proximal end 70 by the sensor 24. However, the sensor 24 does not only receive radiation from a point source. Instead, it receives radiation from a spot or region illustrated by spots 74A and 74B in FIG. 4. The spot is a cross-section of a cone, aligned with the sensor 24. As illustrated in FIG. 4, the spot size increase at greater distances from the sensor 24. This allows some infrared radiation from the walls of the thermowell 20 to be received by the infrared sensor 24. The radiation from the walls of the thermowell 20 may not be an accurate indication of the temperature of the process fluid and may thereby introduce errors into the process temperature measurements.

Figure 5:
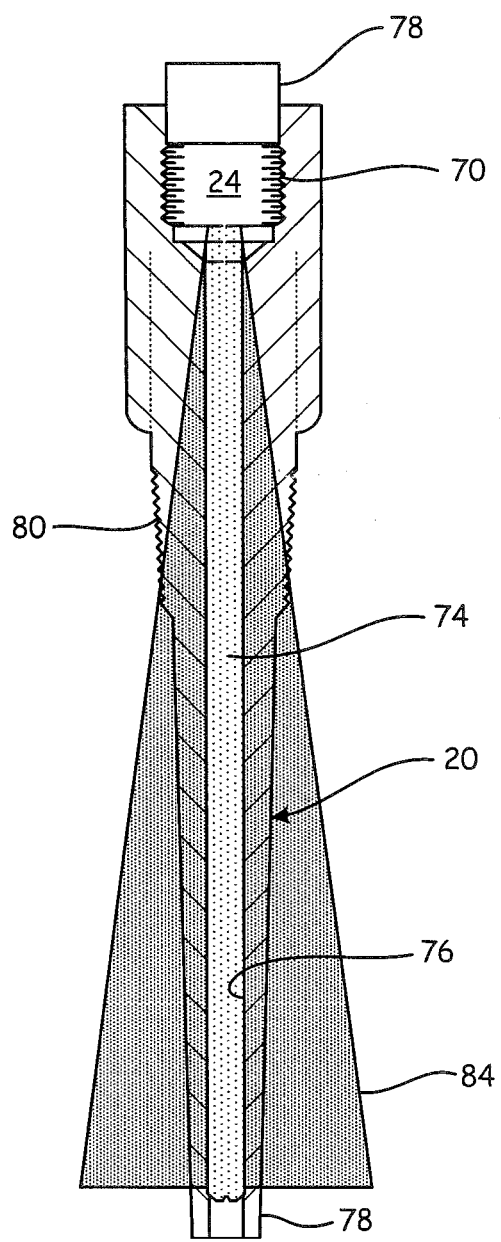
FIG. 5 is a side cross-sectional view of the thermowell of FIG. 2 illustrating a source of errors introduced into temperature measurements due to the spot size illustrated in FIG. 4.

FIG. 5 is a diagram showing thermowell 20 in greater detail. As illustrated in FIG. 5, the thermowell 20 includes an elongate bore 74 extending therethrough between the proximal end 70 and the distal end 72. This bore 74 is surrounded by wall 76 of the thermowell 20. As illustrated in FIG. 5, the thermowell 20 may be threadable received by a mount 78 which carries the infrared sensor 24. Similarly, thermowell 20 includes threads 80 which can be used in mounting the thermowell 20 to process piping 18 through flange 22.

FIG. 5 also shows a conical shaded region 84 which illustrates the spot size of FIG. 4 projected along the length of the pitot tube 20 from the proximal end 70 to the distal end 72. As illustrated in FIG. 5, the shaded region 84 extends beyond wall 76 of the bore of 74 of the thermal wall 20. This shaded region is an indication of the relative amount of radiation received from the wall 76 with respect to the amount of radiation received from the distal end 72. This may introduce an error in the temperature measurement. Typically, the portions of the wall 76 which are closest to the proximal end 70 of thermowell 20 contribute more to errors in the temperature measurements due to temperature differential between the proximal and distal ends 70, 72. In various aspects, a technique is provided which increases the amount of infrared radiation received from the distal end of the bore and decreases the amount of infrared radiation by the sensor 24 from the wall 76 of the bore 74.

Figure 6:
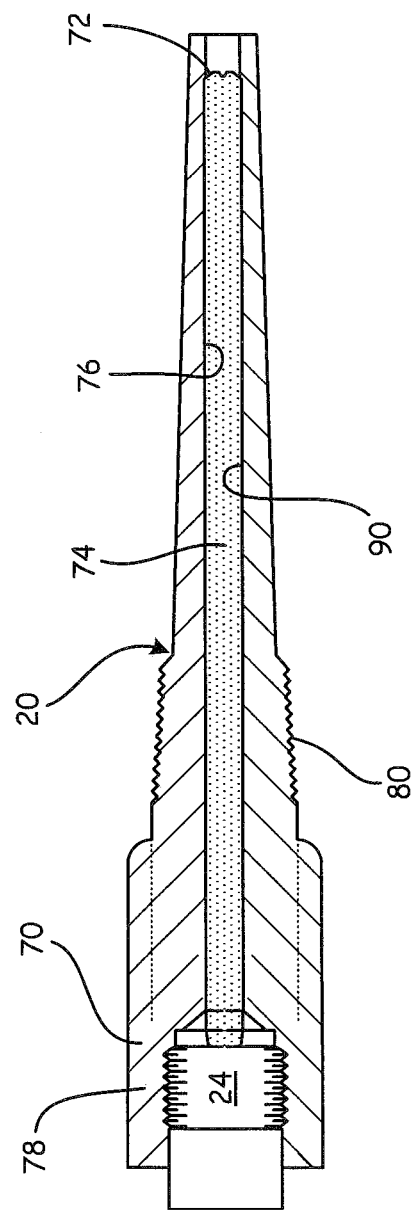
FIG. 6 is a side cross-sectional view of a thermowell including a coating on an interior wall of a bore of the thermowell.

Various techniques may be employed to reduce the amount of radiation received by the sensor 24 from the wall 76 of the bore 74, particularly from the proximal end 70. For example, FIG. 6 is a cross-sectional view of thermowell 20 showing a configuration in which a thin coating 90 is carried on the interior wall 76 of the bore 74. The coating 90 is of a low emissivity material which is applied to or otherwise adhered to the walls 76 of bore 74. Example low emissivity coatings include materials which produce a near mirror finish such as chrome plating. The casting may coat all of, or just a portion of, the wall 76.

Figure 7:
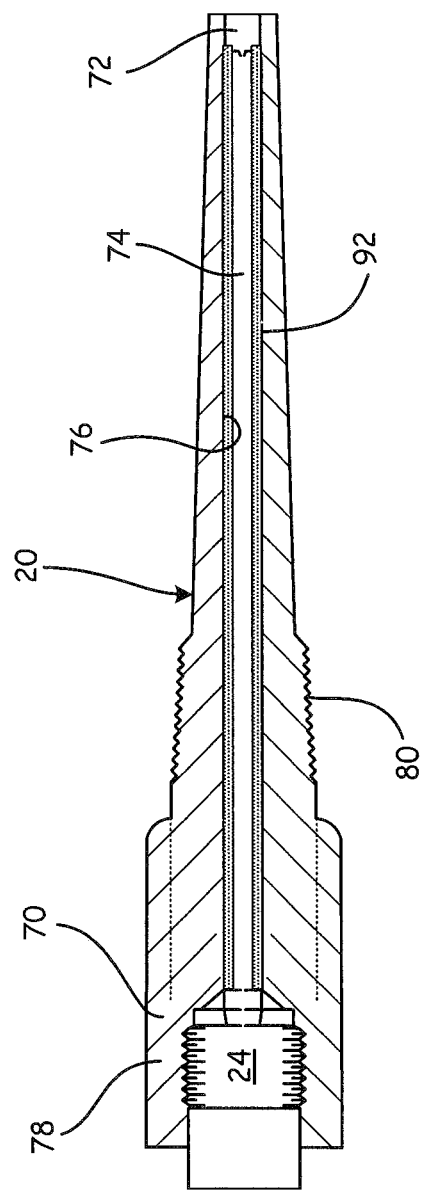
FIG. 7 is a side cross-sectional view of a thermowell illustrating a tube extending through a bore of the thermowell.
Figure 8:
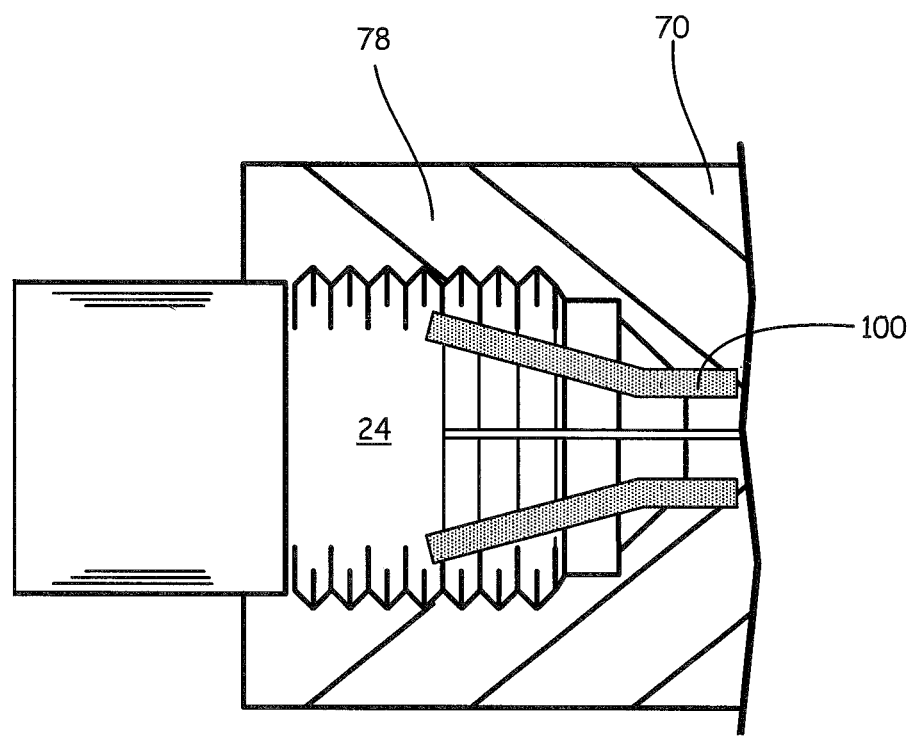
FIG. 8 is a side cross-sectional view of a proximal end of the thermowell illustrating a wave guide or focusing mechanism proximate an infrared sensor.

Another example technique to reduce the emission of infrared radiation from the wall 76 of the bore 74 is to polish or otherwise smooth the surface of the wall 76. This reduces the surface area of the wall 76 and thereby reduces the amount of infrared radiation emitted from the wall 76. FIG. 7 shows a related configuration in which a thin walled tube 92 is received within the bore 74 thereby covering the side wall 76. The tube 92 can be formed of a low emissivity material or may be a polished or plated tube. A hollow sapphire tube also may be employed to thereby reduce the amount of infrared radiation emitted from the walls 76 which reach the sensor 24. The tube 92 acts as a radiation shield to thereby block infrared radiation from the wall 76 from reaching the sensor 24. FIG. 8 is a cross-sectional view of the distal end 70 of thermowell 20 illustrating a related example embodiment in which an infrared shield or beam guide 100 is provided proximate the sensor 24. The shield 100 may be of the same material of tube 92 illustrated in FIG. 7. Shield 100 may operate as a focusing mechanism to focus radiation from the distal end 72 of thermowell 20 onto sensor 12. For example, if shield 100 is of a material which is reflective of IR radiation, it can be used like a mirror to focus the radiation as desired.

The concepts set forth above are various examples of a focusing mechanism which operates to increase the amount of radiation received from the distal end 72 of the thermowell 20 and/or reduce the amount of radiation received from the side wall 76 of the bore 74 of thermowell 20. The focusing mechanism may operate in absolute terms, or may provide a relative increase of the radiation received from distal end 72 with respect to wall 76. Other example focusing mechanisms include a thermal lens or other optical based technique to focus the sensor 24 toward the distal end 72 of thermowell 20. For example, a fine tuned optic with a small distance to spot size ratio such as less than a 6 mm spot size at a distance of 500 mm. Another example configuration to provide a focusing mechanism is to use an infrared camera to implement sensor 24. In such a configuration, pixels of the infrared camera which are focused on the distal end 72 may be used for temperature measurements while those pixels which receive infrared radiation from the wall 76 may be ignored or weighted as desired.

Although the present invention has been described with reference to preferred embodiments, workers skilled in the art will recognize that changes may be made in form and detail without departing from the spirit and scope of the invention.

What is claimed is:

1. A thermowell assembly for measuring a process temperature, comprising:
    an elongate thermowell having an open proximal end and a closed distal end and a sealed bore extending there between and configured to extend into a process fluid, the elongate thermowell configured to mount to a process vessel which carries with process fluid and wherein the elongate thermowell has a side profile which tapers from the proximal end to the distal end;

an infrared sensor at the proximal end of the elongate thermowell configured to detect infrared radiation from the distal end through the bore of the thermowell and responsively provide a sensor output related to an indirect measurement of the process temperature, whereby the infrared sensor is sealed from the process fluid by the elongate thermowell, wherein the infrared sensor is configured to receive infrared radiation from a spot and the spot is defined as a cone which expands radially in a direction along an axis of the cone directed toward the distal end of the thermowell, and a diameter of the spot extends beyond an interior side wall of the bore;

a radiation shield in the bore of the thermowell to reduce infrared radiation received by the sensor from the sidewall of the bore, wherein the infrared shield comprises an infrared beam guide positioned proximate the infrared sensor; and wherein infrared radiation received by the infrared sensor from the interior side wall of the bore is reduced relative to infrared radiation received by the infrared sensor from the closed distal end of the elongate thermowell.

2. The thermowell assembly of claim 1 wherein the radiation shield further comprises a low emissivity coating having a near mirror finish applied to at least a portion of the sidewall of the bore of the thermowell.

3. The thermowell assembly of claim 1 wherein the sidewall of the bore of the thermowell is polished to reduce radiation emission.

4. The thermowell assembly of claim 1 wherein the radiation shield further comprises a tube extending through the bore of the elongate thermowell to thereby reduce infrared radiation received by the infrared sensor from the sidewall of the bore of the thermowell.

5. The thermowell assembly of claim 1 wherein the infrared beam guide is fabricated from a low emissivity material having a near mirror finish.

6. The thermowell assembly of claim 1 including an infrared lens configured to focus infrared radiation received by the infrared sensor from the distal end of the elongate thermowell.

7. The thermowell assembly of claim 1 including an infrared beam guide configured to focus infrared radiation received by the infrared sensor from the distal end of the elongate thermowell.

8. The thermowell assembly of claim 1 wherein the infrared sensor comprises an infrared camera.

9. The thermowell assembly of claim 1 including I/O circuitry configured to provide a temperature output related to temperature of the process fluid based upon the sensor output from the infrared sensor.

10. A thermowell assembly for measuring a process temperature, comprising:

an elongate thermowell having an open proximal end and a closed distal end and a sealed bore extending there between and configured to extend into a process fluid, the elongate thermowell configured to mount to a process vessel which carries with process fluid and wherein the elongate thermowell has a side profile which tapers from the proximal end to the distal end;

an infrared sensor at the proximal end of the elongate thermowell configured to detect infrared radiation from the distal end through the bore of the thermowell and responsively provide a sensor output related an indirect measurement of to the process temperature, whereby the infrared sensor is sealed from the process fluid by the elongate thermowell, wherein the infrared sensor is configured to receive infrared radiation from a spot and the spot is defined as a cone which expands radially in a direction along an axis of the cone directed toward the distal end of the thermowell, and a diameter of the spot extends beyond an interior side wall of the bore; and a focusing mechanism comprising a radiation shield in the bore of the thermowell configured to reduce an amount of infrared radiation received by the infrared sensor from the interior side wall of the bore and/or increase an amount of radiation received from the distal end of the elongate thermowell, wherein the infrared shield comprises an infrared beam guide positioned proximate the infrared sensor.

11. The thermowell assembly of claim 10 wherein the radiation shield further comprises a low emissivity coating having a near mirror finish applied to at least a portion of the sidewall of the bore of the thermowell.

12. The thermowell assembly of claim 10 wherein at least a portion of the sidewall of the bore of the thermowell is polished to reduce radiation emission.

13. The thermowell assembly of claim 10 wherein the radiation shield further comprises a tube extending through the bore of the elongate thermowell to thereby reduce infrared radiation received by the infrared sensor from the sidewall of the bore of the thermowell.

14. The thermowell assembly of claim 10 wherein the infrared beam guide is fabricated from a low emissivity material, wherein the focusing mechanism comprises an infrared beam guide positioned proximate the infrared sensor.

15. The thermowell assembly of claim 10 wherein the focusing mechanism further comprises an infrared lens configured to focus infrared radiation received by the infrared sensor from the distal end of the elongate thermowell.

16. The thermowell assembly of claim 10 wherein the infrared sensor comprises an infrared camera.

17. The thermowell assembly of claim 10 including I/O circuitry configured to provide a temperature output related to temperature of the process fluid based upon the sensor output from the infrared sensor.

* * * * *